United States Patent [19]

Shanbhag

[11] Patent Number: 5,710,794
[45] Date of Patent: Jan. 20, 1998

[54] INITIAL PHASE-LOADING CIRCUIT FOR A FRACTIONALLY-SPACED LINEAR EQUALIZER

[75] Inventor: Naresh Ramnath Shanbhag, Scotch Plains, N.J.

[73] Assignee: Lucent Technologies, Murray Hill, N.J.

[21] Appl. No.: 430,560

[22] Filed: Apr. 28, 1995

[51] Int. Cl.$^6$ .................................................. H04L 27/01
[52] U.S. Cl. ........................................ 375/234; 370/537
[58] Field of Search .................................. 375/229, 231, 375/234, 232, 261; 333/18; 364/724.2; 370/537

[56] References Cited

U.S. PATENT DOCUMENTS

| 4,237,554 | 12/1980 | Gitlin et al. | 375/234 |
|---|---|---|---|
| 4,384,355 | 5/1983 | Werner | 375/234 |
| 4,567,599 | 1/1986 | Mizoguchi | 375/14 |
| 5,070,514 | 12/1991 | Tjahjadi | 375/232 |
| 5,173,925 | 12/1992 | Mizoguchi | 375/14 |
| 5,210,774 | 5/1993 | Abbiate et al. | 375/14 |
| 5,293,401 | 3/1994 | Serfaty | 375/13 |
| 5,311,546 | 5/1994 | Paik et al. | 375/14 |
| 5,475,710 | 12/1995 | Ishizu et al. | 375/232 |

FOREIGN PATENT DOCUMENTS

| 0 524 559 A2 | 1/1993 | European Pat. Off. | H04L 27/38 |

OTHER PUBLICATIONS

Patent application Ser. No. 08/154197, filed Nov. 17, 1993, Titled "Data Recovery Technique Which Avoids A False Convergence State," Cathers, F. R. et al.

J. D. Wang and J. J. Werner, Twenty–Second Annual Asilomar Conference on Signals, Systems, and Computers, Session MP3: "Communications Applications" in Pacific Grove, California, *On The Transfer Function Of Adaptive T/4 Equalizers*, Nov. 1, 1988, Maple Press.

W. Y. Chen et al, Technical memorandum to assist Standards Committee Ti–Telecommunications, Standards Project: T1E1.4/92–149, "Design of Digital Carrierless AM/PM Transceivers," Aug. 19, 1992.

Lee, Edward A. and David G. Messerschmitt *Digital Communication*, Chp. 9, "Adaptive Equalization," pp. 371–407, Kluwer Academic Publishers, Boston, 1988.

W. Y. Chen et al., "Design of Digital Carrierless AM/PM Transceivers," T1E1.4/92–149, Aug. 19, 1992.

*Primary Examiner*—Stephen Chin
*Assistant Examiner*—T. Ghebretinsae

[57] ABSTRACT

An initial phase-loading circuit (IPLC) for a fractionally-spaced linear equalizer (FSLE) includes a signal coupling component adapted to be coupled to the FSLE in a configuration so as to selectively introduce time-shifted discrete signals. The FSLE includes a set of initial filter tap coefficients that provide a discrete signal to the FSLE, perform discrete signal equalization using the FSLE at least until substantial convergence of the filter tap coefficients, and provide to the FSLE a time-shifted discrete signal to replace the previously provided discrete signal.

20 Claims, 2 Drawing Sheets

5,710,794

INITIAL PHASE-LOADING CIRCUIT FOR A FRACTIONALLY-SPACED LINEAR EQUALIZER

TECHNICAL FIELD

The present invention relates to communications and, more particularly, to equalizers employed in signal-modulation-based communications systems.

BACKGROUND OF THE INVENTION

Fractionally-spaced linear equalizers or fractionally-spaced linear signal equalizers (FSLEs) may be employed to perform equalization of passband discrete signals. FSLEs are described, for example, in *Digital Communication*, by Lee and Messerschmitt, available from Kluwer Academic Publishers, 1994, herein incorporated by reference. Such FSLEs may be, for example, a component of a receiver for a broadband amplitude and/or phase-modulation-based communications system, such as a digital carrierless AM/PM (CAP) based system. One such application may include use in an asynchronous transfer mode local area network (ATM LAN) or in "fiber-to-the-curb" systems, for example.

One feature of an FSLE for a quadrature amplitude modulation (QAM) or, alternatively, a CAP-based system, for example, is that the FSLE may perform a "blind" start-up, referred to in this context as "blind equalization." More particularly, the FSLE does not need to employ a start-up or training sequence, as may typically be employed for other types of equalizers. Instead, the FSLE filter tap coefficients may be initialized to one out of L possible initial phases, where L is a positive integer greater than one. The FSLE value of L may be obtained as a ratio of the symbol period (T) to the sampling period (T') for the particular FSLE, where T is a multiple of T'. Thus, various initial phases of the L initial phases may be employed by the FSLE until the appropriate initial phase is obtained.

In a typical FSLE, the requirement that one of L initial phases be loaded into the FSLE may introduce significant hardware complexity. For example, if the number of filter taps, N, is large, where N is a positive integer, and the precision of the filter tap coefficients, $M_1$, is also large, where $M_1$ is a positive integer, then the hardware complexity, $H_1$, in terms of 2-to-1 multiplexers in a system employing binary digital signals, for example, may be given by $$H_1 = NLM_1. \qquad (1)$$

A need therefore exists for a technique of reducing the hardware complexity of an initial phase-loading circuit (IPLC) for an FSLE, particularly where the number of filter taps and the precision of the filter tap coefficients may be relatively large.

SUMMARY OF THE INVENTION

Briefly, in accordance with one embodiment of the invention, an initial phase-loading circuit (IPLC) for a fractionally-spaced linear equalizer (FSLE) comprises: a signal coupling component adapted to be coupled to the FSLE; the signal coupling component being adapted to be coupled to the FSLE in a configuration so as to selectively introduce time-shifted discrete signals.

Briefly, in accordance with another embodiment of the invention, a method of initializing a FSLE comprises the steps of: providing a discrete signal to the FSLE, the FSLE including a set of initial filter tap coefficients; performing discrete signal equalization using the FSLE at least until substantial convergence of the filter tap coefficients; and then providing to the FSLE a time shifted discrete signal to replace the previously provided discrete signal, the FSLE including the set of initial filter tap coefficients.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may best be understood by reference to the following detailed description when read with the accompanying drawings in which:

DETAILED DESCRIPTION

As previously indicated, fractionally-spaced linear equalizers (FSLEs) are well-known, such as described in the aforementioned text *Digital Communication*, by Lee and Messerschmitt. Such FSLEs have a variety of applications including, for example, passband equalization of discrete signals, although the scope of the invention is not limited in this respect.

Figure 3:
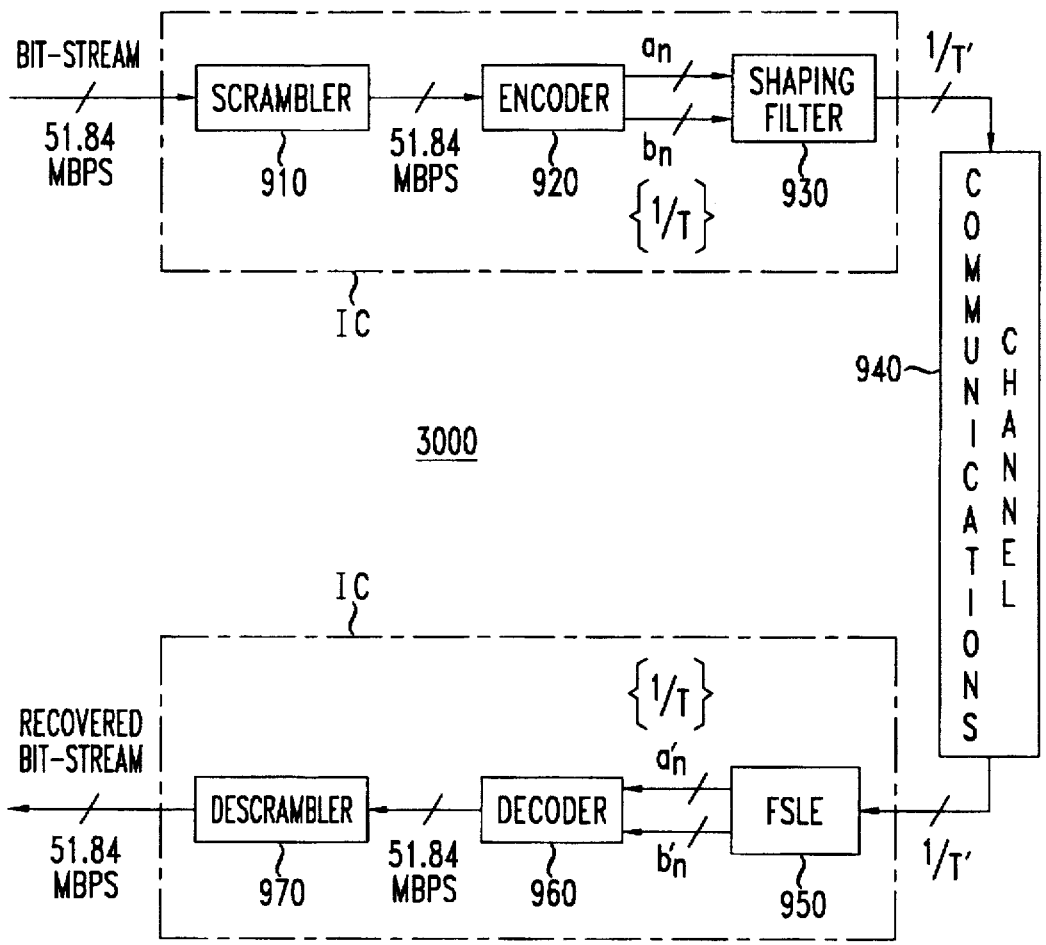
FIG. 3 is a schematic diagram illustrating an embodiment of a communications system that may employ a FSLE.

One example of an embodiment 3000 of a communications system employing a FSLE is illustrated by the schematic diagram of FIG. 3, although the invention is, of course, not limited in scope to use in such a system. As illustrated, communications system 3000 includes: a transmitting end comprising a scrambler 910, an encoder 920, and a shaping filter 930 and a receiving end comprising a FSLE 950, a decoder 960, and a descrambler 970. The transmitting end and receiving end communicate via a communications channel 940, such as may comprise twisted pair copper wires, a co-axial cable, or optical fibers, for example. The transmitter and the receiver for the communications system may each be incorporated in an integrated circuit (IC) chip, although the invention is, of course, not limited in scope in this respect. Likewise, a single IC may include both a transmitter and a receiver for such a communications system. A bit-stream to be transmitted is provided to scrambler 910 at the transmitting end. In this particular embodiment, for example, the bit-stream comprises a 51.84 Mbps bit-stream, although the scope of the invention is not limited in this respect. The bit-stream may comprise, for example, video signals, audio signals, or data signals that have been segmented and reassembled as a bit-stream for transmission via communications channel 940, although the invention is, again, not limited in scope in this respect.

As is well-known for communications systems, the bit-stream may be scrambled by scrambler 910 using a pseudo-random signal processing technique. For example, in one embodiment, a boolean algebraic polynomial may be implemented, such as by using digital logic gates. The signal resulting from this process may then be applied to encoder 920. Encoder 920 may implement any one of a number of signal modulation schemes, such as amplitude modulation, phase modulation, frequency modulation, or combinations thereof. For example, a QAM or CAP-based modulation scheme may be employed, although the invention is not limited in scope in this respect. As illustrated, encoder 920, in this particular embodiment of a communications system, provides discrete complex signal samples, $a_n+ib_n$, at a frequency of 1/T, referred to in this context as the "symbol frequency," to shaping filter 930. Although "i" is not explicitly illustrated in FIG. 3, the signal $b_n$ in FIG. 3 refers to the imaginary component of a complex discrete signal sample. The discrete signals provided by encoder 920 each represent a symbol to be transmitted via communications channel 940 in the form of a discrete signal in the Inphase-Quadrature (I-Q) plane. Before transmission, however, the signal is "shaped" in the frequency domain by shaping filter 930, as illustrated. Shaping filter 930 in this particular embodiment effectively bandlimits the discrete signals for transmission. As illustrated, the discrete signals transmitted via communications channel 940 have a frequency of 1/T', referred to in this context as the "sampling frequency," T being a multiple of T', as previously indicated.

At the receiving end, FSLE 950 samples the receiving signals at 1/T', the sampling frequency, and produces discrete signals, $a'_n+ib'_n$, at 1/T, the symbol frequency. These discrete signals represent symbols that have been transmitted via channel 940. Decoder 960 decodes these discrete signals to provide a bit-stream, at 51.84 Mbps in this particular embodiment, and descrambler 970 descrambles this bit-stream by applying an inverse pseudo-random process with respect to scrambler 910 to obtain the recovered bit-stream illustrated in FIG. 3.

One aspect regarding use of a fractionally-spaced linear equalizer relates to initialization. More particularly, in some communications systems, the equalizer may employ a start-up or training sequence before signal communication is commenced. Such an approach need not be employed with an FSLE. However, the FSLE filter tap coefficients may be initialized to one of L initial phases, where L is a positive integer and is related to the ratio of the symbol period (T) to the sampling period (T') for the FSLE, as previously described. In the context of the invention, one of L initial phases of an FSLE filter tap coefficient refers to a situation where the initial filter tap coefficients may each have one of L initial values, where the L possible values for each coefficient have a phased relationship to one another, as explained in more detail below. As explained in more detail later and as illustrated in part in FIG. 4, for example, a set of initial filter tap coefficients for a FSLE may be obtained by sampling a distribution at intervals related to the sample period, T'. An alternative set of initial filter tap coefficients for the FSLE having a different phase may be obtained by delaying the sampling of the distribution by the sample period. Thus, this alternative set of initial filter tap coefficients may be obtained by sampling the distribution for each respective filter tap coefficient at a point shifted by T' relative to the filter tap coefficient obtained by the sampling performed to obtain the previous set of coefficients. Likewise, yet another alternative set may be obtained by another shift of T' in the same direction. Thus, L alternative sets of initial phases for the FSLE filter tap coefficients may be obtained, each filter tap coefficient of the FSLE therefore having L initial phase values as a result. It will, of course, now be appreciated that the invention is not restricted in scope to a particular sampling approach to obtain the alternative initial phases of the FSLE filter tap coefficients so long as the appropriate values are obtained. For example, the second set need not be obtained from the first set in particular by a delay in sampling of T'.

Figure 2:
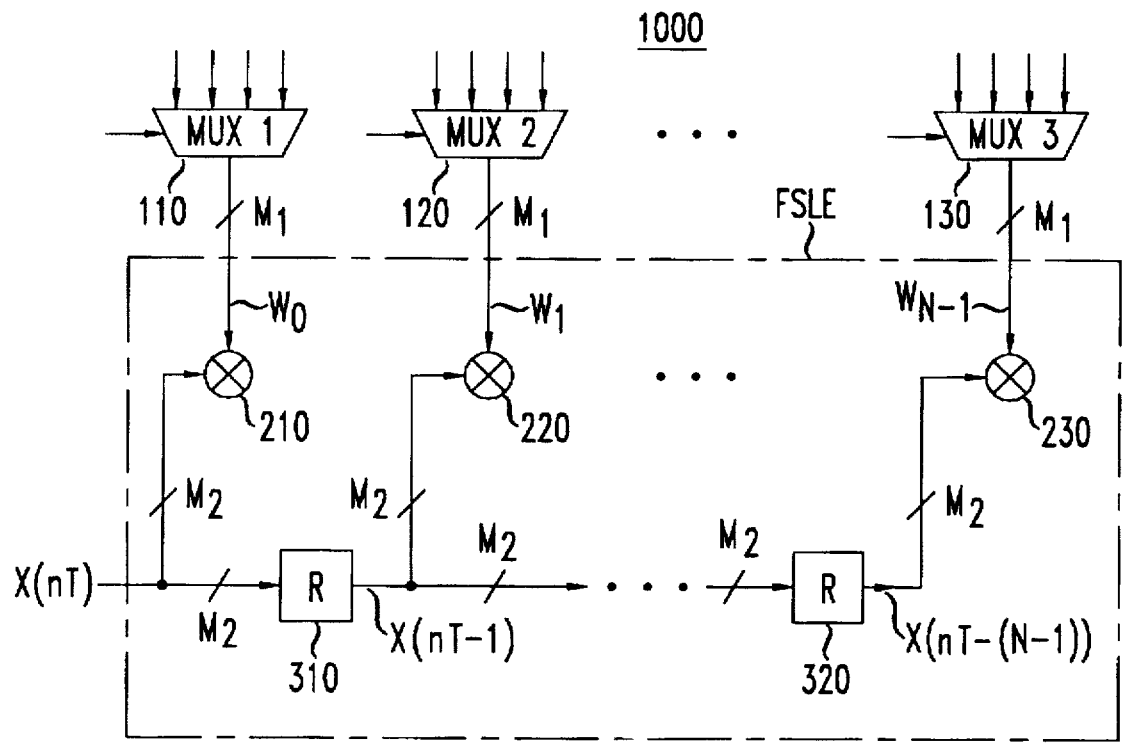
FIG. 2 is a schematic diagram illustrating an embodiment of an initial phase-loading circuit (IPLC) for a fractionally-spaced linear equalizer (FSLE).

Assume for the purposes of illustration, for example, that for a particular communications system employing a FSLE the value of L is 4, although the scope of the invention is not limited in this respect. FIG. 2 illustrates an embodiment 1000 of an initial phase-loading circuit (IPLC) for an FSLE at the receiving end of such a communications system, for example. It will, of course, be appreciated that FIG. 2 also illustrates a portion of a circuit embodiment of a FSLE for processing either the inphase component or the quadrature component of received discrete signals. Assuming, for example, that the FSLE embodiment processes the inphase component, a similar approach may likewise be applied to the quadrature component. The embodiment shown omits a slicer and a filter tap coefficient or weight update portion for ease of explanation, although these are typically components of conventional FSLEs. Thus, the FSLE filter tap coefficients are initialized to an initial phase of the L initial phases. As is well-known, such as described in the aforementioned *Digital Communication* text, the output signal produced by the FSLE may be provided to the slicer (not shown) which may be employed to obtain an estimate of the signal error. The error signal obtained may likewise be employed to update the filter tap coefficients of the FSLE so that the filter tap coefficients may over time substantially converge to a set of filter tap coefficients that results in an acceptable level of signal error. However, ultimately, if the initial phase employed is not correct, as reflected, for example, by the bit integrity of the recovered bit-stream, the FSLE filter tap coefficients may be reinitialized with another initial phase of the L initial phases.

This is illustrated by the embodiment shown in FIG. 2 in which each filter tap coefficient of the FSLE is realized by a signal coupling component or device, such as respective multiplexers 110, 120 and 130, that may be employed to selectively couple or multiplex one of the L initial phases, in this instance four initial phases, to the particular filter tap, as illustrated in FIG. 2 for this particular FSLE. As further illustrated in FIG. 2, each multiplexer or MUX, such as MUXes 110, 120 and 130, provides $M_1$ bits or binary digital signals to a respective multiplier, such as multipliers 210, 220 or 230. The number of bits, $M_1$, may be a relatively large number, such as, for example, 23 bits. Likewise, the number of filter taps, N, may be relatively large, such as on the order of 64, for example. Likewise, the discrete signal provided in the form of a plurality of binary digital signals is illustrated in FIG. 2 as having $M_2$ bits. For example, typically the discrete signal may be 8 bits, although the invention is not limited in scope in this respect. Thus, in terms of binary digital signals, the complexity of the embodiment of FIG. 2 may be represented by equation (1), previously described, which, for this example, may constitute 5888 as $H_1$ for the values of L, N, and $M_1$ previously described. As illustrated in FIG. 2, in addition to MUXes 110, 120 and 130 and multipliers 210, 220 and 230, the FSLE embodiment also includes registers, such as 310 and 320, for example, which operate as delay elements for the discrete signal being processed by the FSLE. Likewise, although not explicitly illustrated in FIG. 2, the output signal produced by the multipliers, such as multipliers 210, 220 and 230, may then be superpositioned or accumulated in order to perform the signal filtering desired.

Figure 1:
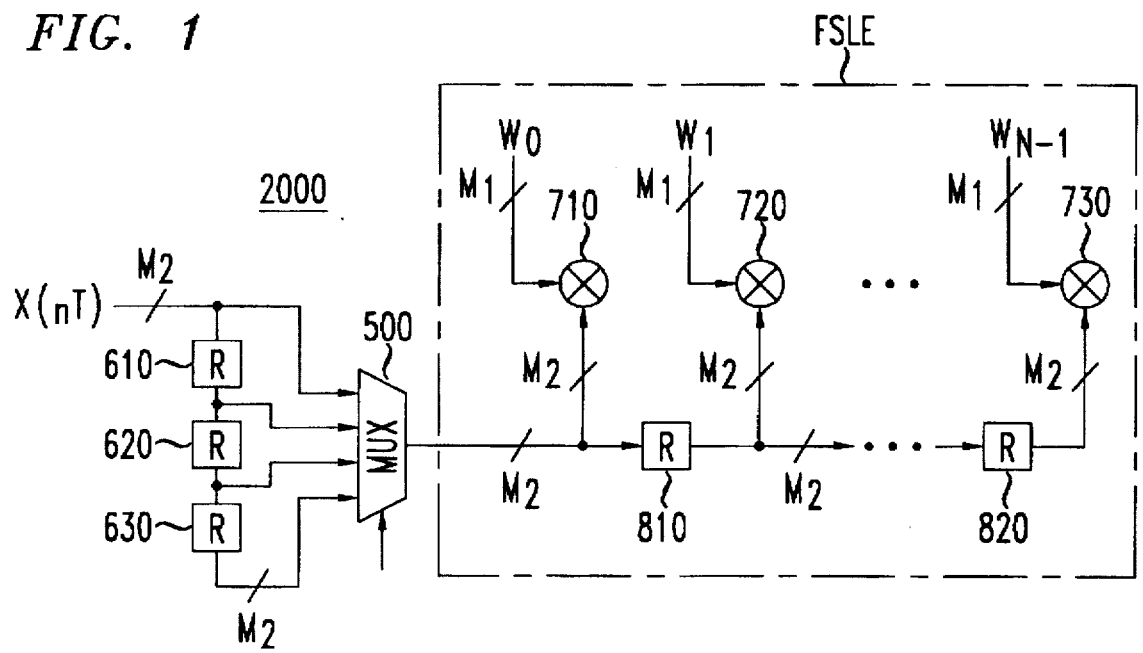
FIG. 1 is a schematic diagram illustrating an embodiment of an initial phase-loading circuit (IPLC) for a fractionally-spaced linear equalizer (FSLE) in accordance with the invention.

FIG. 1 illustrates an embodiment 2000 of an IPLC for a FSLE in accordance with the invention. Again, the FSLE embodiment may be employed to process either the inphase component or the quadrature component or both components of a received discrete signal. As illustrated in FIG. 1, IPLC 2000 comprises a signal coupling component, such as multiplexer 500, adapted to be coupled to a FSLE in a configuration so as to selectively introduce time-shifted discrete signals, as opposed to alternative phases of the FSLE filter tap coefficients. It will, of course, be appreciated that the scope of the invention is not restricted to a multiplexer. Any signal coupling component or device capable of being adapted to be coupled to a FSLE in a configuration so as to provide alternative discrete signals should suffice. More particularly, in this particular embodiment, MUX 500 is adapted to couple alternative delayed versions of a discrete signal, such as X(nT), to the FSLE. As illustrated in this particular FSLE embodiment, the FSLE comprises a plurality of multipliers, such as 710, 720 and 730, and a plurality of registers, such as registers 810 and 820, coupled in a configuration so as to implement the FSLE. Of course, the invention is not limited in scope to this particular embodiment of an FSLE. For example, the multipliers may be implemented by any one of a number of different techniques. Nonetheless, for the embodiment illustrated in FIGS. 1 and 2, the discrete signal comprises a plurality of bits or binary digital signals, $M_2$, such as 8. Thus, the hardware complexity of this particular embodiment of an IPLC for an FSLE in accordance with the invention is provided by the following equation.

$$H_2 = LM_2 \quad (2)$$

Using the numbers recited for the embodiment described in FIG. 1, this provides a hardware complexity of 32 in contrast with the hardware complexity of 5888 for the embodiment shown in FIG. 2. Thus, this embodiment of an IPLC for a FSLE in accordance with the invention illustrates a relatively large reduction in hardware complexity.

As illustrated by this particular embodiment of an IPLC for an FSLE in accordance with the invention, in comparison with circuit shown in FIG. 2, alternative time-shifted, or delayed in this particular embodiment, versions of a discrete signal are provided to each filter tap of the FSLE, as described in more detail hereinafter. In contrast, for the circuit illustrated in FIG. 2, alternative initial phases of the coefficients of the filter taps are provided to the FSLE. For the embodiment of an IPLC for an FSLE in accordance with the invention shown in FIG. 1, only one initial phase of the coefficients for the filter taps is employed.

Figure 4:
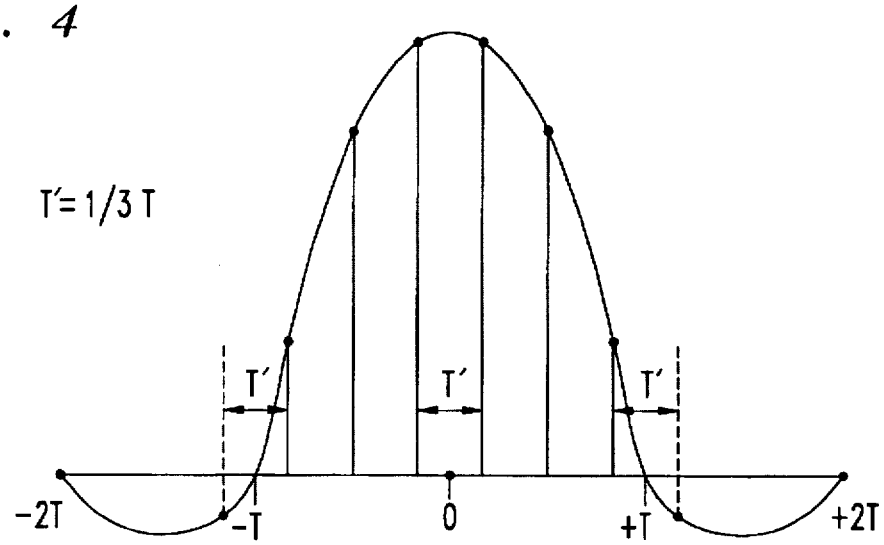
FIG. 4 is a plot illustrating a distribution that may be sampled to obtain the initial filter tap coefficients for a FSLE.

More particularly, the coefficients for the filter taps of the FSLE may be obtained by sampling a distribution at the sampling frequency, 1/T'. In this particular example, as explained in more detail hereinafter, a square root raised-cosine shaping distribution may be sampled. Likewise, as previously discussed, alternative phases of the coefficients may be obtained by shifting the sampling of the distribution by the sampling period, T', or multiples thereof. Because T' is a multiple of T, these alternative sample values thereby provide alternative initial phases for each coefficient. This is illustrated by FIG. 4 where L=3, although it will be understood that the plot of the distribution shown as sampled is provided merely for purposes of illustration and is not intended to illustrate a particular distribution that may be used in actual practice.

A basis for the reduction in hardware for an IPLC for a FSLE in accordance with the invention, such as the embodiment illustrated in FIG. 1, relates to the distribution of the initial filter tap coefficients. A square root raised-cosine shaping distribution, for example, may be used, as described in "Design of Digital Carrierless AM/PM Transceivers," AT&T/Bellcore Contribution T1E1.4/92-149, Aug. 19, 1992 by Chen, Im and Werner, herein incorporated by reference. The initial filter tap coefficients at the alternative ends of the FSLE have a relatively small magnitude in comparison with the remaining coefficients and the initial filter tap coefficients employed for the FSLE may include small variations about an ideal square root raised-cosine shaping distribution without a substantial degradation in performance by the FSLE. Thus, as is well-known, the discrete output signal produced by the FSLE may be expressed by the following equation:

$$Y_j(nT) = \sum_{i=0}^{N-1} W_{i-j} X(nT - iT) \quad (3)$$

where $j=0, 1, \ldots, L-1$ refers to one of the L initial phases, $W_0, W_1, \ldots, W_{N-1}$ are the initial filter tap coefficient values, $X(nT)$ is a discrete signal, n indexes the symbols and i indexes the samples. However, based on the previous discussion, $W_i = 0$ for $i<0$ and $i>N-1$. Furthermore, substituting, $i-j=k$ into equation (3) provides the following equation:

$$Y_j(nT) = \sum_{k=-j}^{N-1-j} W_k X(nT - (j-k)T) \quad (4)$$

Equation (4) illustrates that, based on the previous discussion, a technique for implementing equation (3) above may be accomplished by time-shifting a discrete signal, as illustrated in FIG. 1, instead of providing alternative initial phases of the filter tap coefficients as illustrated in FIG. 2.

As illustrated by the particular embodiment shown in FIG. 1, in this particular embodiment of an IPLC for a FSLE in accordance with the invention, registers 610, 620, and 630 provide respective delay elements with respect to a discrete signal, such as X(nT) in FIG. 1. Therefore, a signal coupling component, MUX 500 in this particular embodiment, is adapted to be coupled to the FSLE in a configuration so as to selectively introduce alternative time-shifted versions of a discrete signal in this particular embodiment. Furthermore, in this particular embodiment, for example, a delayed version of a discrete signal that has been delayed by either one, two, or three symbol periods may be introduced by MUX 500.

An embodiment of an IPLC for a FSLE in accordance with the invention may be employed to initialize the FSLE by the following method. The FSLE may have a symbol period, T, and a sampling period, T', T being a multiple L of T', L being a positive integer greater than one. A discrete signal may be employed to initialize the FSLE by first providing the discrete signal to the FSLE. The FSLE includes a set of initial filter tap coefficients. For example, as previously described, a discrete signal obtained at the receiving end of a communications system may be applied to the FSLE, such as FSLE 950 illustrated in FIG. 3, although the scope of the invention is not limited to use in this particular system. The FSLE may then perform discrete signal equalization at least until substantial convergence of the filter tap coefficients has occurred. As previously described, and as is well-known, substantial convergence of the filter tap coefficients may be identified by using a slicer (not shown) at the output port of the FSLE. If after substantial convergence has occurred, the integrity of the recovered bit-stream does not correspond to the transmitted bit-stream, then this indicates that the FSLE should be reinitialized because the initial phase employed was not the correct initial phase. Therefore, the filter tap coefficients of the FSLE may be reinitialized.

Likewise, a time-shifted discrete signal may be selectively introduced into the FSLE.

The integrity of the recovered bit-stream may be verified by any one of a number of techniques. For example, where the recovered bit-stream comprises a bit-stream that has been reassembled and segmented, the header and framing of the bit-stream may be verified at the receiving end of the communication system. Alternatively, instead of checking the integrity of the recovered bit-stream, such by the technique last described, after substantial convergence has occurred, it is possible to assess whether the FSLE has been properly initialized based upon the filter tap coefficients obtained. More particularly, the FSLE was properly initialized if the filter tap coefficients for the FSLE applied to the inphase discrete signal components substantially comprise the hilbert transform of the filter tap coefficients for the FSLE applied to the quadrature discrete signal components and vice-versa. Assuming that the FSLE was not properly initialized, based, for example, on the integrity of the recovered bit-stream or based upon the hilbert transform of the filter tap coefficients obtained, then a time-shifted discrete signal may be provided to the FSLE to replace the previously provided discrete signal. Of course, the FSLE would include the set of initial filter tap coefficients to replace the substantially converged filter tap coefficients. Again, the FSLE may perform discrete signal equalization at least until substantial convergence occurs. This process may be repeated until the recovered bit-stream or the filter tap coefficients of the FSLE indicate that the FSLE has been properly initialized.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

The invention claimed is:

1. An initial phase-loading circuit (IPLC) for a fractionally-spaced linear signal equalizer (FSLE), said circuit comprising:

a source of time-shifted discrete signals; and a signal coupling component, coupled to said FSLE, that receives the time-shifted discrete signals from said source and selectively introduces the time-shifted discrete signals to said FSLE.

2. The IPLC of claim 1, wherein said signal coupling component comprises means for coupling.

3. The IPLC of claim 2, wherein said coupling means comprises a multiplexer.

4. The IPLC of claim 1, wherein said signal coupling component further selectively introduces alternative time-shifted versions of a discrete signal to said FSLE.

5. The IPLC of claim 3, wherein the FSLE comprises filter tap coefficients that include discrete signal sample values distributed substantially in accordance with a square root raised-cosine shaping distribution.

6. The IPLC of claim 1, wherein said time-shifted discrete signals are time-delayed discrete signals.

7. The IPLC of claim 6, wherein said signal coupling component further selectively introduces alternative time-delayed versions of a discrete signal.

8. A communications system comprising:

a receiver including a fractionally-spaced linear equalizer (FSLE) that includes an initial phase-loading circuit (IPLC), said IPLC including a signal coupling component that is coupled to said FSLE and selectively introduces time-shifted discrete signals to said FSLE.

9. The communications system of claim 8, wherein said communications system comprises a communications system employing a CAP-based signal modulation scheme.

10. The communications system of claim 8, wherein said communications system comprises a communications system employing a QAM-based signal modulation scheme.

11. The communications system of claim 8, wherein said communications channel comprises a communications channel selected from the group consisting essentially of twisted-pair copper wires, a co-axial cable, and optical fibers.

12. An integrated circuit comprising:

a fractionally-spaced linear equalizer (FSLE) including an initial phase-loading circuit (IPLC);

said IPLC including:

a signal coupling component that is coupled to said FSLE and selectively introduces time-shifted discrete signals to said FSLE.

13. A method of initializing a fractionally-spaced linear equalizer (FSLE) comprising the steps of:

providing a discrete signal to the FSLE, the FSLE including a set of initial filter tap coefficients;

performing discrete signal equalization using the FSLE at least until substantial convergence of the filter tap coefficients; and providing to the FSLE a time-shifted discrete signal to replace the previously provided discrete signal, the FSLE including the set of initial filter tap coefficients.

14. The method of claim 13, wherein the step of providing to the FSLE a time-shifted discrete signal comprises providing to the FSLE an alternative time-shifted version of the previously provided discrete signal.

15. The method of claim 13, wherein the step of providing to the FSLE a time-shifted discrete signal comprises providing to the FSLE a time-delayed discrete signal.

16. The method of claim 15, wherein the step of providing to the FSLE a time-delayed discrete signal comprises providing to the FSLE an alternative time-delayed version of the previously provided discrete signal.

17. The method of claim 13, wherein the step of performing discrete signal equalization using the FSLE comprises performing discrete signal equalization at the receiving end of a communications system.

18. The method of claim 17, wherein the communications system comprises a communications system employing a CAP-based signal modulation scheme.

19. The method of claim 17, wherein the communications system comprises a communications system employing a QAM-based signal modulation scheme.

20. The method of claim 13, and further comprising, prior to the step of providing the discrete signal to the FSLE, the step of:

providing filter tap coefficients to the FSLE each in the form of a discrete signal, the filter tap coefficients being obtained by sampling a distribution substantially in accordance with a square root raised-cosine shaping distribution.

* * * * *